United States Patent
Paduvalli et al.

(10) Patent No.: US 12,323,809 B2
(45) Date of Patent: Jun. 3, 2025

(54) SYSTEMS AND METHODS FOR AUTHENTICATION BASED ON DYNAMIC RADIO FREQUENCY RESPONSE INFORMATION

(71) Applicant: Verizon Patent and Licensing Inc., Basking Ridge, NJ (US)

(72) Inventors: Vijaya Paduvalli, Fremont, CA (US); Greg Augustus Rusu, Somerset, NJ (US); Jin Yang, Orinda, CA (US); Krishna K. Bellamkonda, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 359 days.

(21) Appl. No.: 17/450,389

(22) Filed: Oct. 8, 2021

(65) Prior Publication Data
US 2023/0116207 A1    Apr. 13, 2023

(51) Int. Cl.
*H04W 12/68* (2021.01)
*H04W 12/06* (2021.01)
*H04W 12/08* (2021.01)

(52) U.S. Cl.
CPC ......... *H04W 12/68* (2021.01); *H04W 12/068* (2021.01); *H04W 12/08* (2013.01)

(58) Field of Classification Search
CPC .............................. H04W 12/68; H04W 12/08
See application file for complete search history.

(56) References Cited

U.S. PATENT DOCUMENTS

| | | | |
|---|---|---|---|
| 11,003,334 B1 * | 5/2021 | Conway | G06Q 40/08 |
| 2011/0263250 A1 | 10/2011 | Mueck et al. | |
| 2014/0047093 A1 * | 2/2014 | Short | G06Q 50/163 |
| | | | 709/223 |
| 2014/0351887 A1 | 11/2014 | Liu | |
| 2014/0355592 A1 * | 12/2014 | Camps | H04W 4/023 |
| | | | 370/338 |
| 2016/0234232 A1 * | 8/2016 | Poder | H04L 63/1416 |
| 2017/0111094 A1 * | 4/2017 | Sartori | H04B 7/0695 |
| 2018/0019901 A1 * | 1/2018 | Choi | H04L 27/2613 |
| 2018/0042045 A1 * | 2/2018 | Choi | H04W 16/14 |
| 2018/0124601 A1 | 5/2018 | Vutukuri | |

(Continued)

OTHER PUBLICATIONS

Zhenqxiong Li, et al.; "E-Eye: Hidden Electronics Recognition through mmWave Nonlinear Effects"; SenSys '18, Nov. 4-7, 2018; Shenzhen, China; pp. 68-81; 2018 Association for Computing Machinery; ACM ISBN 978-1-4503-5952-8/18/11; https://doi.org/10.1145/3274783.3274833.

(Continued)

*Primary Examiner* — Phy Anh T Vu

(57) ABSTRACT

In some implementations, a system may obtain dynamic radio frequency (RF) response information associated with a user equipment and additional dynamic information associated with the user equipment. The system may determine, based on the dynamic RF response information and the additional dynamic information, a current behavior profile of the user equipment. The system may compare the current behavior profile and a baseline behavior profile of the user equipment to generate comparison information. The system may grant or deny, based on the comparison information, the user equipment access to a resource of a private network.

20 Claims, 8 Drawing Sheets

(56) References Cited

U.S. PATENT DOCUMENTS

| | | | | |
|---|---|---|---|---|
| 2018/0241749 | A1* | 8/2018 | Samuel | H04W 12/08 |
| 2018/0242149 | A1* | 8/2018 | Verma | H04L 63/08 |
| 2019/0025367 | A1* | 1/2019 | Vis | H04B 17/104 |
| 2019/0181943 | A1* | 6/2019 | Liang | H04L 25/0204 |
| 2019/0220592 | A1* | 7/2019 | Liu | G06F 21/55 |
| 2019/0289568 | A1* | 9/2019 | Pajovic | H04W 64/003 |
| 2020/0195679 | A1* | 6/2020 | Du | H04L 63/1433 |
| 2021/0041855 | A1* | 2/2021 | Kursun | G06N 20/00 |
| 2022/0021674 | A1* | 1/2022 | Zafar | G06F 21/10 |
| 2022/0027439 | A1* | 1/2022 | Greenberger | H04W 12/68 |
| 2022/0095092 | A1* | 3/2022 | Siddam | H04L 63/102 |
| 2022/0141658 | A1* | 5/2022 | Muthusamy | H04L 63/10 |
| | | | | 726/7 |
| 2023/0085137 | A1* | 3/2023 | Naujok | H04W 12/03 |
| | | | | 713/168 |

OTHER PUBLICATIONS

Trevor J. Bihl, et al.; "Feature Selection for RF Fingerprinting With Multiple Discriminant Analysis and Using ZigBee Device Emissions"; IEEE Transactions on Information Forensics and Security; Aug. 2016; pp. 1862-1874; vol. 11, No. 8; IEEE Xplore.

Jiabao Yu, et al.; "Radio Frequency Fingerprint Identification Based on Denoising Autoencoders"; 2019 International Conference on Wireless and Mobile Computing, Networking and Communications (WiMob); 6 pages; IEEE Xplore.

* cited by examiner

```
500 ─▶
```

- 510 — Identify a user equipment
- 520 — Authenticate the user equipment
- 530 — Obtain dynamic radio frequency (RF) response information associated with the user equipment and additional dynamic information associated with the user equipment
- 540 — Determine a current behavior profile of the user equipment
- 550 — Determine a baseline behavior profile of the user equipment
- 560 — Generate comparison information
- 570 — Grant or deny the user equipment access to a resource of a private network

FIG. 5

SYSTEMS AND METHODS FOR AUTHENTICATION BASED ON DYNAMIC RADIO FREQUENCY RESPONSE INFORMATION

BACKGROUND

An electronic device that includes electronic components provides a radio frequency (RF) response when probed with a high frequency radio wave signal, such as millimeter wave (mmWave) signal. In some cases, the RF response can be used to identify the electronic device.

BRIEF DESCRIPTION OF THE DRAWINGS

FIG. 5 is a flowchart of an example process relating to using dynamic RF response information to authenticate a user equipment.

DETAILED DESCRIPTION OF EXAMPLE EMBODIMENTS

Figure 1A:
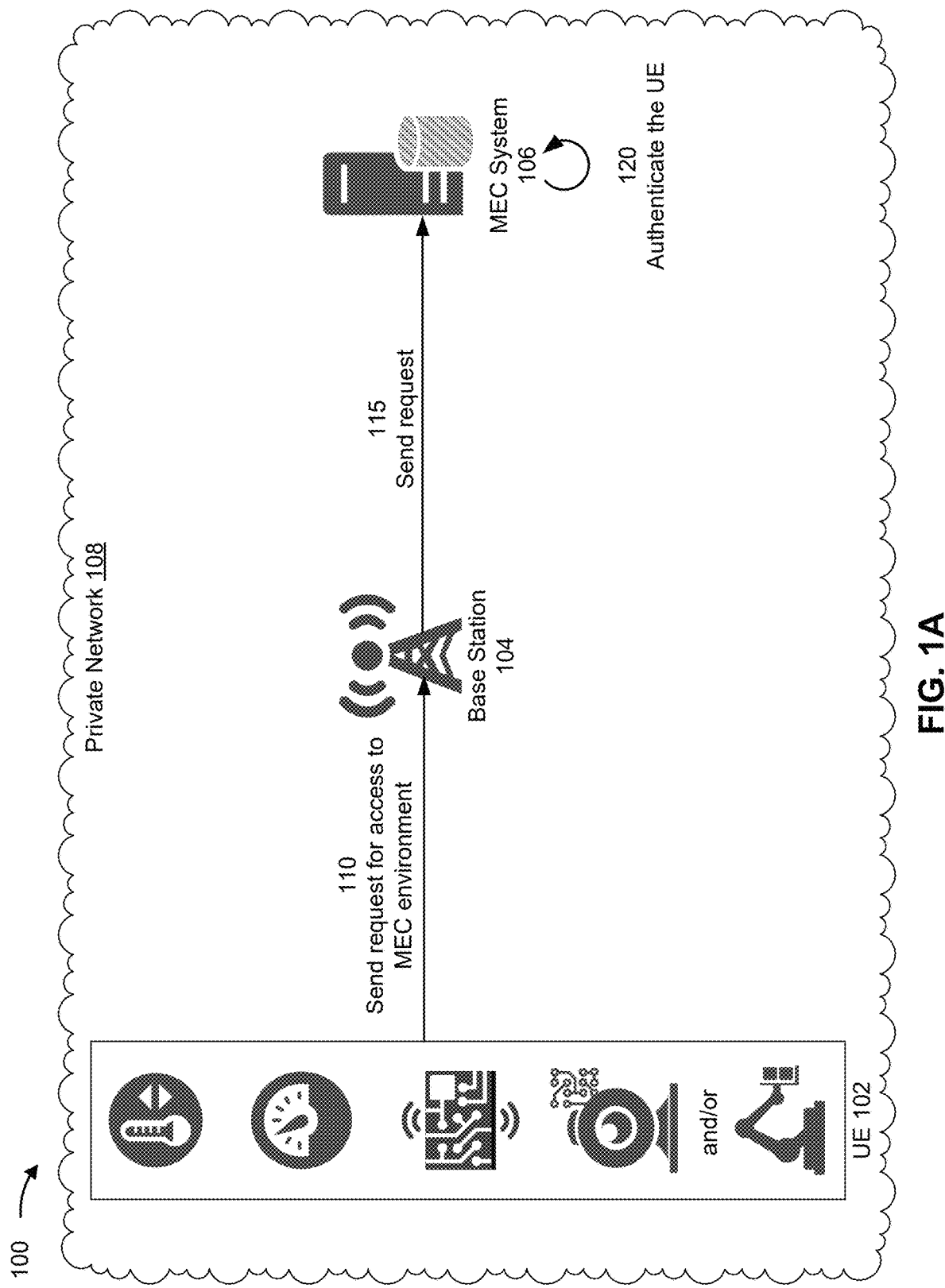
FIGS. 1A-1D are diagrams of an example associated with using dynamic RF response information to authenticate a user equipment.

The following detailed description of example implementations refers to the accompanying drawings. The same reference numbers in different drawings may identify the same or similar elements.

In an industrial Internet of things (IIoT) or industrial control systems (ICS) context, a user equipment may be an IIoT device (e.g., that includes one or more sensors, one or more cameras, and/or one or more mechanical components, among other examples) that operates in an industrial environment. In a typical authentication process, the user equipment provides authentication credentials (e.g., a username and password, a token, or a certificate, among other examples) to an authenticating device to authenticate the user equipment (e.g., to allow the user equipment access to a resource of the industrial environment). However, authentication credentials are often stolen, spoofed, or otherwise compromised, which allows a bad actor to impersonate the user equipment and/or gain access to the resource of the industrial environment. Further, this impacts an ability of other user equipment to effectively operate in the industrial environment. Additionally, in some cases, this causes resources of the other user equipment to be wasted or misapplied (e.g., based on interacting with the impersonated user equipment).

Some implementations described herein provide a multi-access edge computing (MEC) system that obtains dynamic radio frequency (RF) response information associated with a user equipment of a private network and/or additional dynamic information associated with the user equipment. The dynamic RF response information includes data that indicates a respective RF response of the user equipment (e.g., to one or more communication transmission signals, such as one or more mmWave signals, transmitted by a base station of the private network) at one or more instants of time within a period of time (e.g., a previous hour). The additional dynamic information includes information indicating at least one location of the user equipment, information indicating network activity of the user equipment, information indicating task activity of the user equipment, and/or information indicating one or more states of at least one component of the user equipment, within the period of time. The MEC system determines, based on the dynamic RF response information and/or the additional dynamic information, a current behavior profile of the user equipment.

In some implementations, the MEC system determines a baseline behavior profile of the user equipment. For example, in some implementations, the MEC system processes, using a machine learning model, prior dynamic RF response information associated with the user equipment and prior additional dynamic information associated with the user equipment (e.g., that was obtained before the period of time described above) to determine the baseline behavior profile of the user equipment. The MEC system compares the current behavior profile and the baseline behavior profile to generate comparison information. Accordingly, the MEC system grants the user equipment access to a resource of the private network when the MEC system determines that the comparison information indicates that there is no difference, or insignificant differences, between the current behavior profile and the baseline behavior profile. Alternatively, the MEC system denies the user equipment access to the resource of the private network when the MEC system determines that the comparison information indicates one or more significant differences between the current behavior profile and the baseline behavior profile. For example, the MEC system 106 may deny access when an indication of a dynamic RF response behavioral characteristic of the user equipment in the current behavior profile does not match an indication of the dynamic RF response behavioral characteristic of the user equipment in the baseline behavior profile.

In this way, the MEC system authenticates the user equipment based on one or more dynamic behavioral characteristics, such as a dynamic RF response behavioral characteristic, of the user equipment. This removes a need for authentication credentials to authenticate the user equipment. Further, the one or more dynamic behavioral characteristics uniquely identify the UE and are continuously updating and/or evolving, which increases a complexity, and therefore a security, for the user equipment to access the resource of the private network. Additionally, it is difficult for a bad actor to imitate or spoof the dynamic behavioral characteristics of the user equipment, which decreases a likelihood that an impostor user equipment would be successfully authenticated by the MEC system. Accordingly, some implementations described herein reduce a likelihood that a bad actor can be granted access to the resource of the private network (e.g., as compared to securing access to the resource using a typical authentication process), which improves the security for the user equipment to access the resource of the private network. This improves a security of the private network, which allows other user equipment to effectively operate in the private network and/or minimizes waste or misapplication of resources of the other user equipment (e.g., by minimizing a likelihood that the other user equipment is interacting with a compromised user equipment).

FIGS. 1A-1D are diagrams of one or more examples 100 associated with using dynamic RF response information to authenticate a user equipment. As shown in FIGS. 1A-1D, example(s) 100 may include a user equipment (UE) 102, a base station 104, a MEC system 106, and/or a private network 108, which are described in more detail in connection with FIG. 3.

As shown in FIGS. 1A-1D, the UE 102, the base station 104, and the MEC system 106 may be included within the private network 108. For example, the UE 102, the base station 104, and the MEC system 106 may each be positioned at a particular virtual location within the private network 108 and/or may each be positioned at a particular physical location (e.g., a particular longitude, a particular latitude, a particular floor, and/or a particular elevation) within the private network 108. The private network 108 may provide (e.g., via the MEC system 106 and/or the base station 104) resources, such as computing resources and/or networking resources to the UE 102 (e.g., when the UE 102 has been authenticated by the MEC system 106). The private network 108 may located at an "edge" of another network (e.g., a wireless communication network, such as cellular network that is associated with a core network 310 and/or data network 320 described herein).

As shown in FIG. 1A, and by reference number 110, the UE 102 may send a request for access to the private network 108. For example, when the UE 102 is activated and/or added to the private network 108, the UE 102 may undergo a bootstrap process. As part of the bootstrap process, the UE 102 may send the request to the base station 104. Accordingly, as shown by reference number 115, the base station 104 may send the request to the MEC system 106.

The MEC system 106 may process (e.g., parse) the request to identify the UE 102 (e.g., based on identification information included in the request) and/or determine that the UE 102 is to access the private network 108. As shown by reference number 120, the MEC system 106 may authenticate the UE 102 to grant the UE 102 access to the private network 108. For example, the request may include one or more authentication credentials (e.g., that are associated with the UE 102), such as a username and password, a passcode (e.g., a numerical string, a text string, and/or a personal identification number (PIN), an authentication certificate, and/or an authentication token, among other examples). The MEC system 106 may process (or may cause another device, such as an authentication server, to process) the one or more authentication credentials (e.g., using one or more authentication processes, such as a username and password authentication technique, a passcode authentication technique, a certificate authentication technique, and/or a token authentication technique, among other examples) to authenticate the UE 102 (e.g., determine that the one or more authentication credentials are valid).

Additionally, or alternatively, the MEC system 106 may obtain original RF response information associated with the UE 102. For example, the MEC system 106 may include a data structure (e.g., a database, a table, and/or an electronic file, among other examples) that stores and/or maintains RF response information associated with UEs of the private network 108 (e.g., UEs that are included in the private network 108 or that are to be included in the private network 108). The MEC system 106 may search (e.g., based on identification information included in the request that identifies the UE 102) to identify an entry in the data structure that is associated with the UE 102. The entry may include the original RF response information, which may include data indicating an RF response of the UE 102 at one or more instants of time within a particular period of time (e.g., a particular period of time associated with formation and/or assembly of the UE 102, a particular period of time associated with an initial addition of the UE 102 to the private network 108, and/or a particular period of time associated with an update or modification to the UE 102, among other examples). Accordingly, the MEC system 106 may determine (e.g., in a similar manner as that described elsewhere herein) subsequent RF response information associated with the UE 102, which may include data indicating an RF response of the UE 102 at one or more instants of time after the particular period of time. The MEC system 106 then may authenticate the UE 102 (e.g., based on the original RF response information and the subsequent RF response information). For example, the MEC system 106 may compare the original RF response information and the subsequent RF response information and may authenticate the UE 102 when the comparison indicates that the original RF response information and the subsequent RF response information matches (e.g., respective frequency variations indicated by the original RF response and the subsequent RF response are the same or similar, within a tolerance).

Accordingly, based on authenticating the UE 102, the MEC system 106 may grant the UE 102 access to the private network 108 (e.g., allow the UE 102 to join the private network 108 and/or allow the UE 102 to access one or more resources of the private network 108).

Figure 1B:
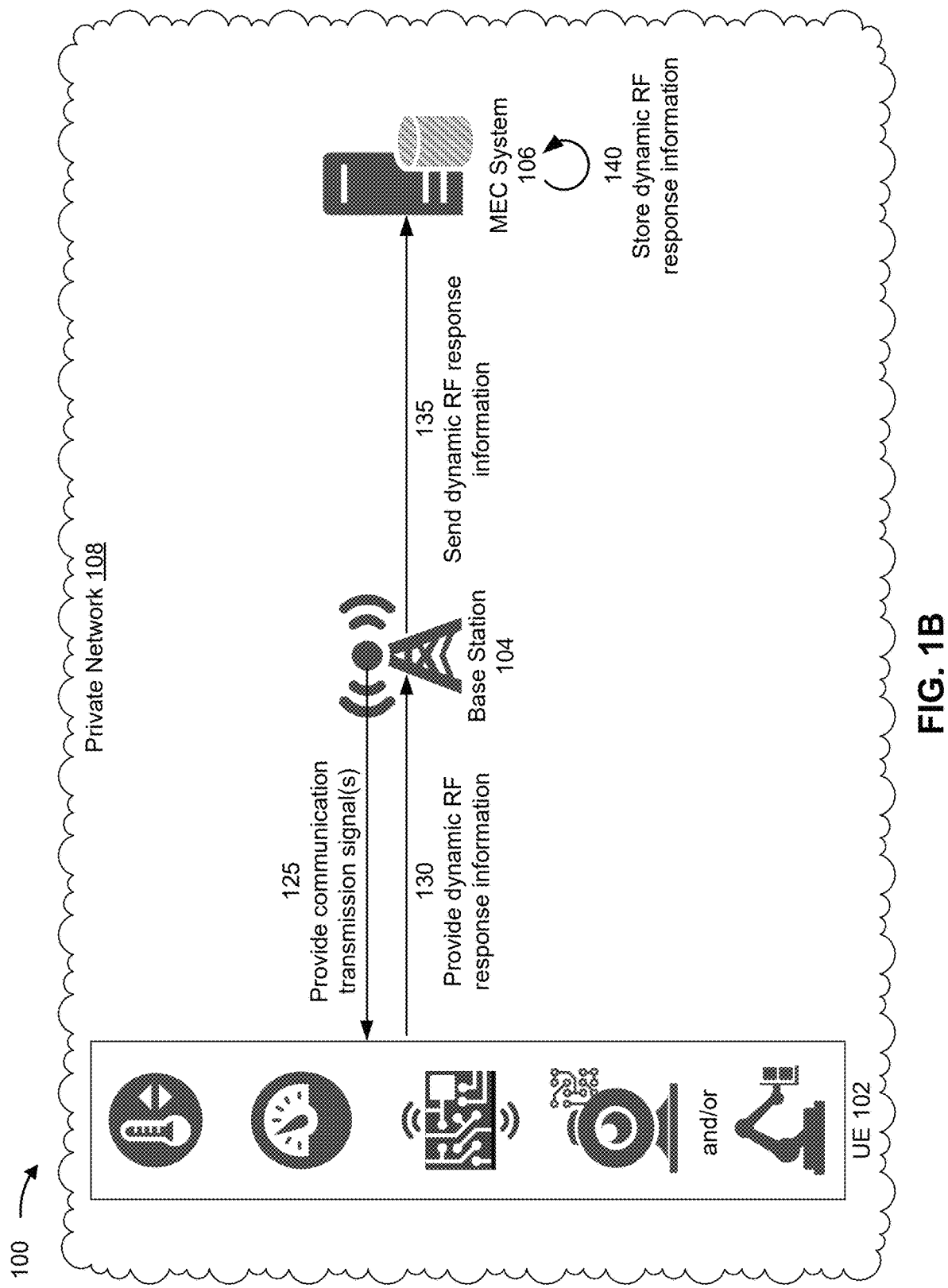

As shown in FIG. 1B, and by reference number 125, the base station 104 may provide one or more communication transmission signals to the UE 102. For example, the base station 104 may provide the one or more communication transmission signals to facilitate communication with a wireless communication network, such as a 5G cellular network. Accordingly, the one or more communication transmission signals may be high frequency radio wave signals, such as mmWave signals. As shown by reference number 130, the UE 102 may provide dynamic RF response information associated with the UE 102 to the base station 104. For example, the UE 102 may automatically provide the dynamic RF response information to the base station 104 in response to the base station 104 providing the one or more communication transmission signals to the UE 102. The dynamic RF response information may include data that indicates a respective RF response of the UE 102 at one or more instants of time within a period of time (e.g., a period of time in which the UE 102 responds to the one or more communication transmission signals provided by the base station 104).

As shown by reference number 135, the base station 104 may send the dynamic RF response information to the MEC system 106. For example, the base station 104 may send the dynamic RF response information to the MEC system 106 as the base station 104 detects and/or receives the dynamic response information (e.g., in real-time or near real-time). As another example, the base station 104 may send the dynamic RF response information to the MEC system 106 on a scheduled basis (e.g., every 5 minutes, every hour, or every 12 hours), on an on-demand basis (e.g., based on a command received from the MEC system 106), on a triggered basis (e.g., after a particular amount of dynamic RF response information is received by the base station 104), and/or on an ad-hoc basis (e.g., to facilitate an authentication process, as described elsewhere herein).

As shown by reference number 140, the MEC system 106 may store the dynamic RF response information. For example, the MEC system 106 may store the dynamic RF response information in the data structure that stores and/or maintains RF response information associated with UEs of the private network 108 (e.g., that is described herein in relation to FIG. 1A). The MEC system 106 may identify an entry in the data structure that is associated with the UE 102 and may cause the entry to include the dynamic RF response information.

Figure 1C:
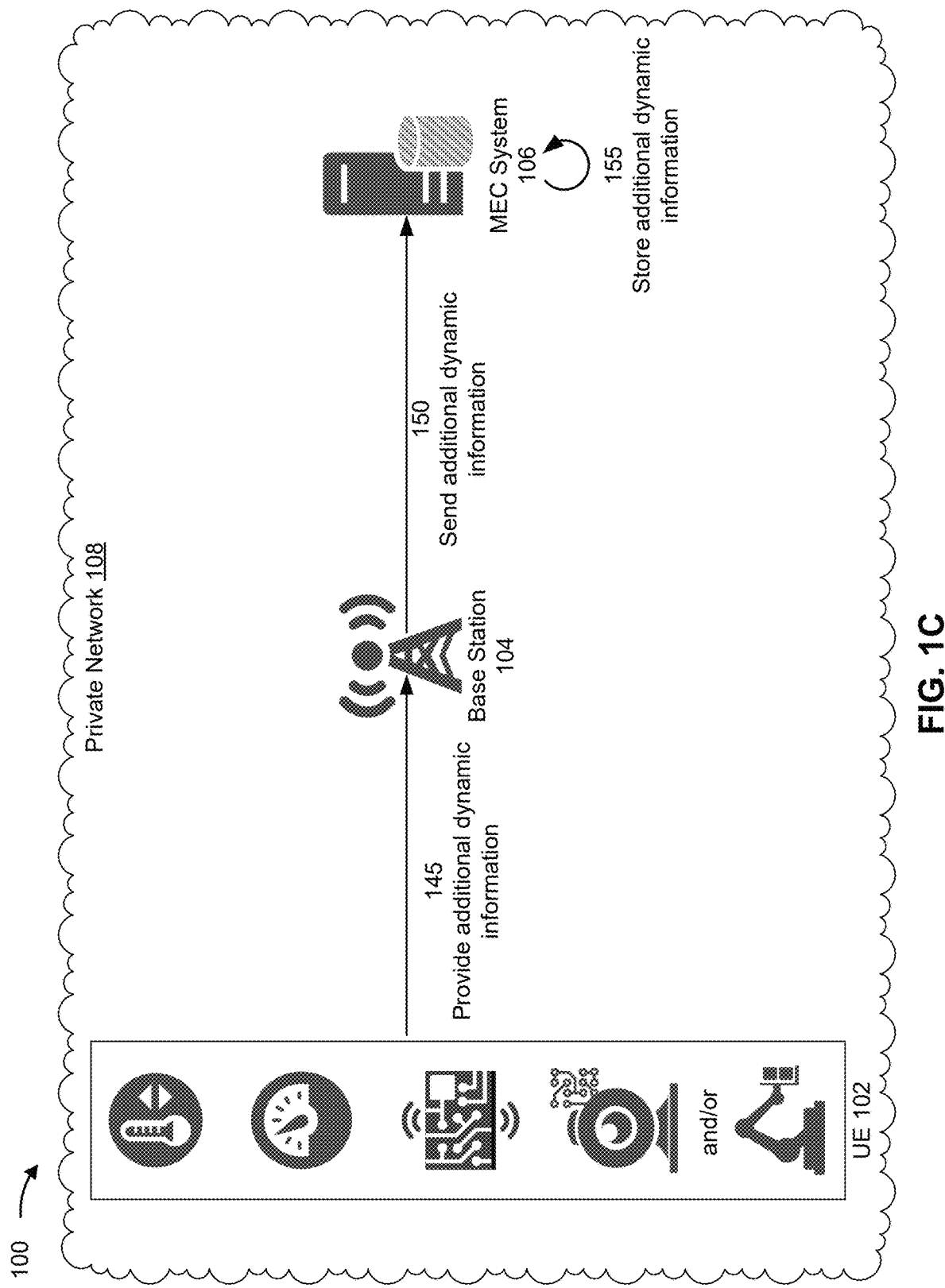

As shown in FIG. 1C, and by reference number 145, the UE 102 may provide additional dynamic information associated with the UE 102 to the base station 104. For example, the UE 102 may provide one or more communication transmission signals (e.g., one or more high frequency radio wave signals, such as mmWave signals) to the base station 104. The UE 102 may generate and include the additional dynamic information in the one or more communication transmission signals. Accordingly, as shown by reference number 150, the base station 104 may send the additional dynamic information to the MEC system 106. In some implementations, the additional dynamic information may include information indicating at least one location of the UE 102 within a period of time (e.g., the period of time associated with the dynamic RF response information), information indicating network activity of the UE 102 within the period of time, information indicating task activity of the UE 102 within the period of time, and/or information indicating one or more states of at least one component of the user equipment within the period of time. For example, the additional dynamic information may indicate one or more physical locations of the UE 102 in the private network 108 within the period of time, one or more virtual locations of the UE 102 in the private network 108 within the period of time, one or more process task groups that are associated with the UE 102 within the period of time, one or more tasks (e.g., computing tasks, sensing tasks, and/or physical tasks, among other examples) performed by the UE 102 within the period of time, a respective amount of time that the UE 102 performs the one or more tasks within the period of time; an amount of data transmitted by the UE 102 within the period of time, a respective identifier of one or more devices (e.g., other UEs of the private network 108) that communicate with the UE 102 within the period of time, a respective state of one or more components of the UE 102 (e.g., a charge status of a battery of the UE 102, a number of operation hours of an engine of the UE 102, a quality of an oil of the UE 102, and/or an air pressure associated with one or more tires of the UE 102, among other examples) at one or more instants of time within the period of time, and/or a power consumption of the UE 102 within the period of time.

As shown by reference number 155, the MEC system 106 may store the additional dynamic information. For example, the MEC system 106 may store the additional dynamic information in a data structure (e.g., a database, a table, and/or an electronic file, among other examples) that stores and/or maintains dynamic information associated with UEs of the private network 108 (e.g., UEs that are included in the private network 108 or that are to be included in the private network 108). The MEC system 106 may identify an entry in the data structure that is associated with the UE 102 and may cause the entry to include the additional dynamic information.

Figure 1D:
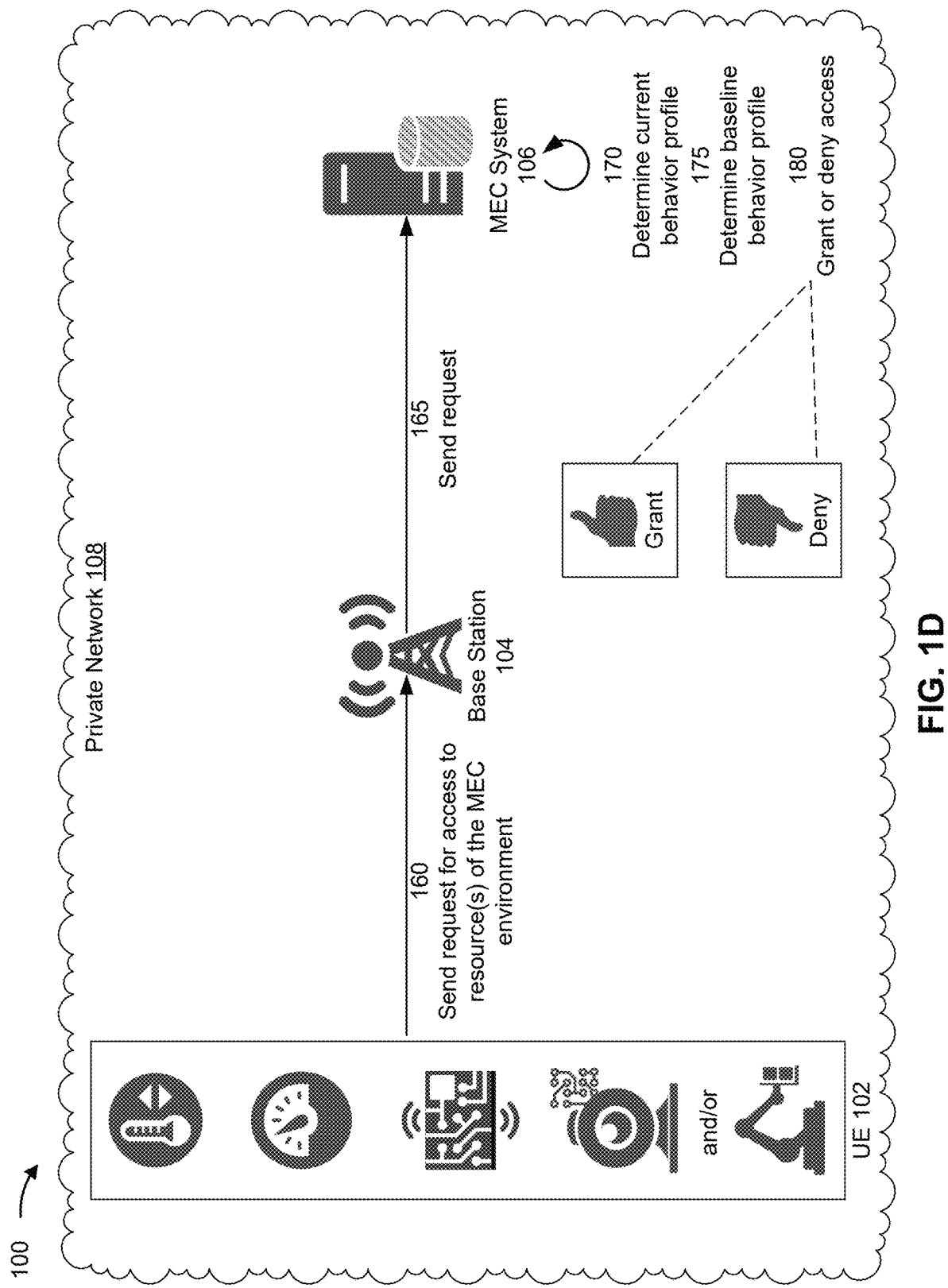

As shown in FIG. 1D, and by reference number 160, the UE 102 may send a request for access to a resource of the private network 108. For example, when the UE 102 is configured to perform a particular task (e.g., that requires access to the resource of the private network 108), the UE 102 may send the request to the base station 104. Accordingly, as shown by reference number 165, the base station 104 may send the request to the MEC system 106.

The MEC system 106 may process (e.g., parse) the request to identify the UE 102 (e.g., based on an identifier associated with the UE 102 included in the request) and/or determine that UE 102 wants access to the resource of the private network 108. Accordingly, as further shown in FIG. 1D (e.g., by reference numbers 170 through 180), the MEC system 106 may perform one or more additional processing steps to grant or deny the UE 102 access to the resource of the private network 108. Alternatively, instead of reactively determining whether to grant or deny access to the resource of the private network 108 (e.g., based on receiving the request by the UE 102), the MEC system 106 may proactively perform the one or more additional processing steps (e.g., continuously, on a scheduled basis, on an on-demand basis, on a triggered basis, or on an ad-hoc basis) to determine whether to grant or deny access to the resource of the private network 108.

As shown in FIG. 1D, and by reference number 170, the MEC system 106 may determine a current behavior profile of the UE 102 (e.g., based on the dynamic RF response information and/or the additional dynamic information). For example, the MEC system 106 may search (e.g., based on the identifier associated with the UE 102) the data structure that stores and/or maintains RF response information associated with UEs of the private network 108 to identify the entry associated with the UE 102 and may process (e.g., parse) the entry to obtain the dynamic RF response information, and/or may search (e.g., based on the identifier associated with the UE 102) the data structure that stores and/or maintains dynamic information associated with UEs of the private network 108 to identify an entry associated with the UE 102 and may process (e.g., parse) the entry to obtain the additional dynamic information. The MEC system 106 may process the dynamic RF response information and/or the additional dynamic information to determine the current behavior profile. For example, the MEC system 106 may combine one or more portions of the dynamic RF response information and/or one or more portions of the additional dynamic information to determine the current behavior profile.

The current behavior profile may indicate one or more current behavioral characteristics of the UE 102, such as one or more behavioral characteristics of the UE 102 within the period of time in which the UE 102 responds to the one or more communication transmission signals provided by the base station 104 (e.g., as described herein in relation to FIG. 1B). For example, the current behavior profile may indicate respective RF responses of the UE 102 at one or more first instants of time within the period of time, one or more physical locations of the UE 102 in the private network 108 within the period of time, one or more virtual locations of the UE 102 in the private network 108 within the period of time, one or more process task groups that are associated with the UE 102 within the period of time, one or more tasks (e.g., computing tasks, sensing tasks, and/or physical tasks, among other examples) performed by the UE 102 within the period of time, a respective amount of time that the UE 102 performs the one or more tasks within the period of time, an amount of data transmitted by the UE 102 within the period of time, a respective identifier of one or more devices (e.g., other UEs of the private network 108) that communicate with the UE 102 within the period of time, a respective state of one or more components of the UE 102 (e.g., a charge status of a battery of the UE 102, a number of operation hours of an engine of the UE 102, a quality of an oil of the UE 102, and/or an air pressure associated with one or more tires of the UE 102, among other examples) at one or more second instants of time within the period of time, and/or a power consumption of the UE 102 within the period of time.

As shown in FIG. 1D, and by reference number 175, the MEC system 106 may determine a baseline behavior profile of the UE 102. The baseline behavior profile may indicate one or more baseline behavioral characteristics of the UE 102, such as one or more behavioral characteristics of the UE 102 prior to the period of time in which the UE 102 responds to the one or more communication transmission signals provided by the base station 104 (e.g., as described herein in relation to FIG. 1B).

In some implementations, the MEC system 106 may use a machine learning model to determine the baseline behavior profile. For example, the MEC system 106 may identify and process (e.g., parse) the entry associated with the UE 102 in the data structure that stores and/or maintains RF response information associated with UEs of the private network 108 to obtain prior dynamic RF response information associated with the UE 102 (e.g., dynamic RF response information associated with the UE 102 that occurred prior to the period of time described above) and/or the entry associated with the UE 102 in the data structure that stores and/or maintains dynamic information associated with UEs of the private network 108 to obtain prior additional dynamic information associated with the UE 102 (e.g., additional dynamic information associated with the UE 102 that occurred prior to the period of time). The MEC system 106 may process, using the machine learning model, the prior dynamic RF response information and the prior additional dynamic information to determine the baseline behavior profile of the user equipment.

In some implementations, the MEC system 106 may train the machine learning model based on information included in the data structure that stores and/or maintains RF response information associated with UEs of the private network 108 and/or information included in the data structure that stores and/or maintains dynamic information associated with UEs of the private network 108. For example, the MEC system 106 may train the machine learning model based on first historical information that includes dynamic RF response information associated with one or more UEs in the private network 108, second historical information that includes additional dynamic information associated with one or more UEs in the private network 108, and/or additional information, such as indications of one or more behavioral characteristics respectively associated with the one or more UEs and/or indications of baseline behavior profiles respectively associated with the one or more UEs. Using the first historical information, the second historical information, and/or the additional information as inputs to the machine learning model, the MEC system 106 may train the machine learning model to identify one or more behavioral characteristics and/or a baseline behavior profile that is associated with particular dynamic RF response information and/or particular additional dynamic information. In some implementations, the machine learning model may be trained and/or used in a manner similar to that described below with respect to FIG. 2.

In some implementations, the MEC system 106 may compare the current behavior profile of the UE 102 and the baseline behavior profile of the UE 102 to determine whether at least one difference exists between the current behavior profile and the baseline behavior profile. For example, the MEC system 106 may identify, based on the baseline behavior profile, first information associated with a behavioral characteristic of the user equipment and may identify, based on the current behavior profile, second information associated with the behavioral characteristic of the user equipment. The MEC system 106 may determine whether the first information matches the second information (e.g., determine whether one or more attributes of the behavioral characteristic respectively indicated by the first information and the second information are the same or similar, within a tolerance). Accordingly, the MEC system 106 may generate comparison information. When the MEC system 106 determines that, for all behavioral characteristics of the UE 102, respective first information matches respective second information, the MEC system 106 may cause the comparison information to indicate that there is no difference between the current behavior profile and the baseline behavior profile. Alternatively, when the MEC system 106 determines that, for one or more behavioral characteristics of the UE 102, respective first information does not match respective second information, the MEC system 106 may cause the comparison information to indicate at least one difference between the current behavior profile and the baseline behavior profile (e.g., for the one or more behavioral characteristics of the UE 102).

As shown by reference number 180, the MEC system 106 may grant or deny the UE 102 access to the resource of the private network 108 (e.g., based on the current behavior profile of the UE 102, the baseline behavior profile of the UE 102, and/or the comparison information). For example, when the comparison information indicates that there is no difference between the current behavior profile and the baseline behavior profile, the MEC system 106 may grant the UE 102 access to the resource of the private network 108.

As another example, when the comparison information indicates at least one difference between the current behavior profile and the baseline behavior profile, the MEC system 106 may identify, based on the comparison information, a behavioral characteristic of the UE 102 and/or a deviation associated with the behavioral characteristic. The deviation may be, for example, an RF response deviation (e.g., when the behavioral characteristic is the RF response of the UE 102), a location deviation (e.g., when the behavioral characteristic is a physical or a virtual location of the user device in the private network 108), a task activity deviation (e.g., when the behavioral characteristic is a task group assignment or a task performance of the user device in the private network 108), a network deviation (e.g., when the behavioral characteristic is a network or communication characteristic of the UE 102 in the private network 108), or a state deviation (e.g., when the behavioral characteristic is associated with respective states of one or more components of the UE 102), among other examples.

The MEC system 106 may identify one or more authentication criteria associated with the behavioral characteristic. For example, the MEC system 106 may use the machine learning model to determine one or more ranges of "normal" values associated with the behavioral characteristic and may generate the one or more authentication criteria based on the one or more ranges. As another example, the MEC system 106 may search a data structure (e.g., a database, a table, and/or an electronic file, among other examples) that stores and/or maintains authentication criteria for an entry associated with the behavioral characteristic and may process (e.g., parse) the entry to identify the one or more authentication criteria. Accordingly, the MEC system 106 may determine whether the one or more authentication criteria are satisfied (e.g., based on the deviation associated with the behavioral characteristic). When the MEC system 106 determines that the one or more authentication criteria are satisfied, the MEC system 106 may grant the UE 102 access to the resource of the private network 108. Alternatively, when the MEC system 106 determines that the one or more authentication criteria are not satisfied, the MEC system 106 may deny the UE 102 access to the resource of the private network 108.

In some implementations, after the MEC system 106 has denied the UE 102 access to the resource of the private network 108, the MEC system 106 may communicate with the UE 102 to attempt to authenticate the UE 102 (e.g., in a similar manner as that described herein in relation to FIG. 1A). For example, the MEC system 106 may send a request to the UE 102 (e.g., via the base station 104) for authentication information and the UE 102 may send, in response, one or more authentication credentials to the MEC system 106 (e.g., via the base station 104). The MEC system 106 may process (or may cause another device, such as an authentication server, to process) the one or more authentication credentials to authenticate the UE 102 (e.g., determine whether the one or more authentication credentials are valid). When the MEC system 106 determines that the one or more authentication credentials are valid, the MEC system 106 may grant the UE 102 access to the resource of the private network 108. Alternatively, when the MEC system 106 determines that the one or more authentication credentials are not valid, the MEC system 106 may deny the UE 102 access to the resource of the private network 108.

In some implementations, after the MEC system 106 has granted or denied the UE 102 access to the resource of the private network 108, the MEC system 106 may update (or retrain) the machine learning model. For example, the MEC system 106 may update the machine learning model based on the request for the UE 102 to access the resource of the private network 108, the dynamic RF response information associated with the UE 102, the additional dynamic information associated with the UE 102, the current behavior profile associated with the UE 102; the baseline behavior profile associated with the UE 102; the comparison information (e.g., that indicates that there is no difference between the current behavior profile and the baseline behavior profile or that indicates at least one difference between the current behavior profile and the baseline behavior profile), and/or information indicating whether the MEC system 106 granted or denied the UE 102 access to the resource of the private network 108. In this way, the MEC system 106 may improve an accuracy of the machine learning model.

As indicated above, FIGS. 1A-1D are provided as an example. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of one or more examples 100 may perform one or more functions described as being performed by another set of devices of one or more examples 100.

Figure 2:
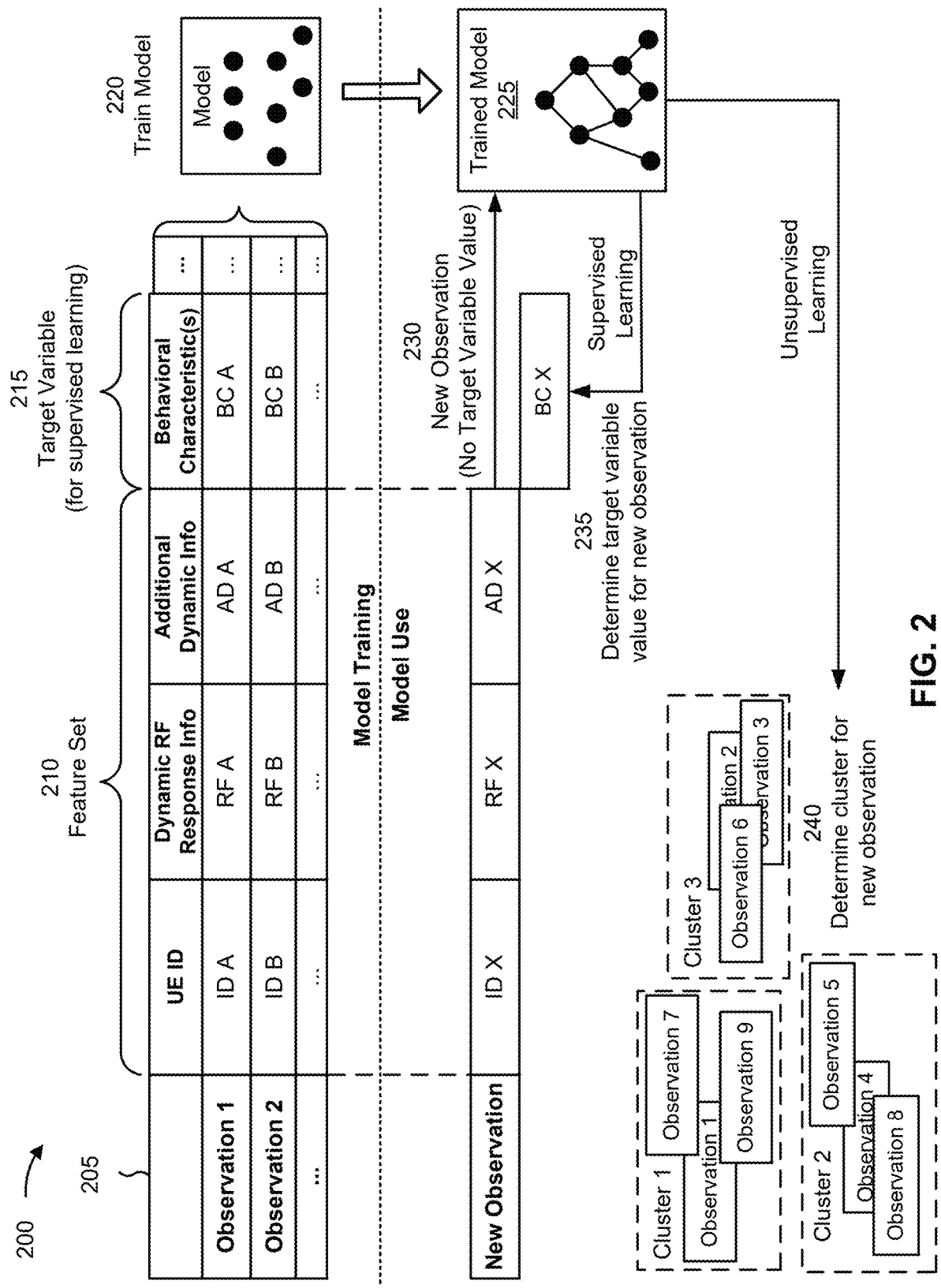
FIG. 2 is a diagram illustrating an example of training and using a machine learning model in connection with using dynamic RF response information to authenticate a user equipment.

FIG. 2 is a diagram illustrating an example 200 of training and using a machine learning model in connection with using dynamic RF response information to authenticate a user equipment. The machine learning model training and usage described herein may be performed using a machine learning system. The machine learning system may include or may be included in a computing device, a server, a cloud computing environment, or the like, such as the MEC system 106, the base station 104, and/or the UE 102 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the MEC system 106, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the MEC system 106. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of UE identification (ID) information, a second feature of dynamic RF response information, a third feature of additional dynamic information, and so on. As shown, for a first observation, the first feature may have a value of ID A, the second feature may have a value of RF A, the third feature may have a value of AD A, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is one or more baseline behavioral characteristics, which has a value of BC A for the first observation. In some implementations, the target variable is a baseline behavior profile (e.g., that indicates one or more baseline behavioral characteristics).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of ID X, a second feature of RF X, a third feature of AD X, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of BC X for the target variable of one or more baseline behavioral characteristics for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first automated action may include, for example, granting or denying access to a resource of the private network 108.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first baseline behavioral characteristic), then the machine learning system may provide a first recommendation and/or may perform a first automated action and/or may cause a first automated action to be performed (e.g., by instructing another device to perform the automated action) based on classifying the new observation in the first cluster.

In some implementations, the recommendation and/or the automated action associated with the new observation may be based on a target variable value having a particular label (e.g., classification or categorization) and/or may be based on whether a target variable value satisfies one or more thresholds (e.g., whether the target variable value is greater than a threshold, is less than a threshold, is equal to a threshold, falls within a range of threshold values, or the like).

In this way, the machine learning system may apply a rigorous and automated process to identify one or more behavioral characteristics and/or a baseline behavior profile associated with a UE. The machine learning system enables recognition and/or identification of tens, hundreds, thousands, or millions of features and/or feature values for tens, hundreds, thousands, or millions of observations, thereby increasing accuracy and consistency and reducing delay associated with identifying one or more behavioral characteristics and/or a baseline behavior profile associated with a UE relative to requiring computing resources to be allocated for tens, hundreds, or thousands of operators to manually identify one or more behavioral characteristics and/or a baseline behavior profile associated with a UE using the features or feature values.

As indicated above, FIG. 2 is provided as an example. Other examples may differ from what is described in connection with FIG. 2.

Figure 3:
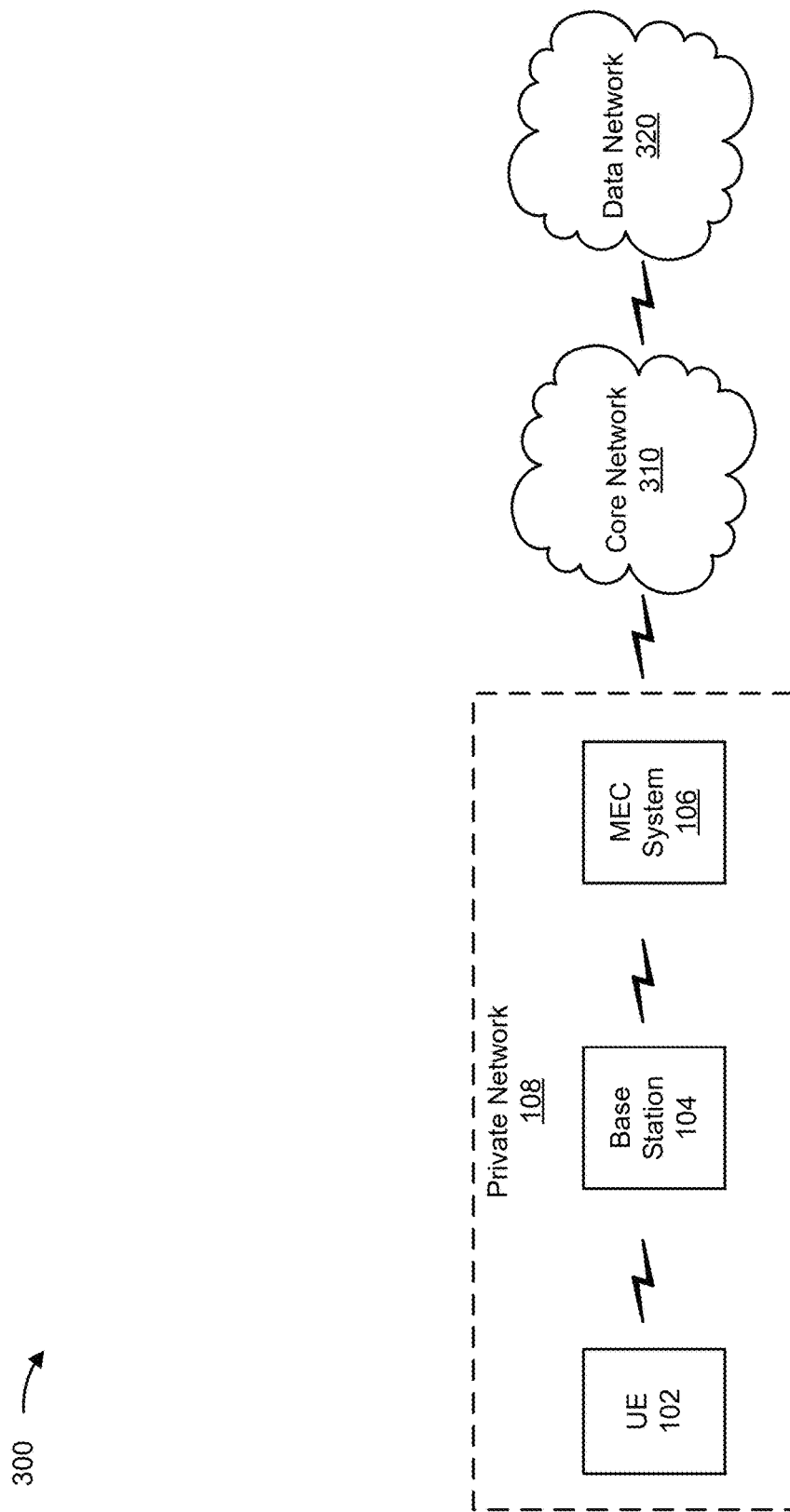
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may the UE 102, the base station 104, the MEC system 106, the private network 108, a core network 310, and/or a data network 320. Devices of environment 300 may interconnect via wired connections, wireless connections, or a combination of wired and wireless connections.

The UE 102 includes one or more devices capable of receiving, generating, storing, processing, and/or providing information, as described elsewhere herein. In some implementations, the UE 102 may include an Internet of things (IoT) UE, such as a narrowband IoT (NB-IoT) UE, an IIoT UE, and/or another type of IoT UE. For example, the UE 102 may include one or more sensors (e.g., to measure one or more attributes associated with the UE 102 and/or the private network 108), one or more cameras, one or more robots, one or more drones, one or more industrial machines, one or more smart machines, among other examples. In some implementations, the UE 102 may include one or more devices capable of communicating with the base station 104, the MEC system 106, and/or the data network 320 (e.g., via the core network 310). For example, the UE 102 may include a wireless communication device, a radiotelephone, a personal communications system (PCS) terminal (e.g., that can combine a cellular radiotelephone with data processing and data communications capabilities), a smart phone, a laptop computer, a tablet computer, an autonomous vehicle, and/or a similar device. In some implementations, the UE 102 may include a machine-type communication (MTC) UE, such as an evolved or enhanced MTC (eMTC) UE.

The base station 104 includes one or more devices capable of receiving, generating, storing, processing, and/or providing information, as described elsewhere herein. In some implementations, the base station 104 may include one or more devices capable of communicating with the UE 102 using a cellular radio access technology (RAT). For example, the base station 104 may include a base transceiver station, a radio base station, a node B, an evolved node B (eNB), a next generation node B (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, the base station 104 may transfer traffic between the UE 102 (e.g., using a cellular RAT) and the core network 310.

In some implementations, the base station 104 may provide communication transmission signals (e.g., mmWave transmission signals) to the UE 102 (e.g., to facilitate communication with the MEC system 106 and/or the core network 310). The base station 104 may be configured to capture dynamic RF response information associated with the UE 102 that is provided by the UE 102 to the base station 104 and to send the dynamic RF response information to the MEC system 106.

The MEC system 106 includes one or more devices capable of receiving, generating, storing, processing, providing, and/or routing information, as described elsewhere herein. The MEC system 106 may include a communication device and/or a computing device. For example, the MEC system 106 may include a server, such as an application server, a client server, a web server, a database server, a host server, a proxy server, a virtual server (e.g., executing on computing hardware), or a server in a cloud computing system. In some implementations, the MEC system 106 includes computing hardware used in a cloud computing environment. The MEC system 106 may be configured to obtain dynamic RF response information associated with the UE 102 and additional dynamic information associated with the UE 102 to determine whether to grant or deny the UE 102 access to a resource of the private network 108.

The private network 108 includes a network that delivers computing as a service, whereby shared resources, services, and/or other resources may be provided to the UE 102. The private network 108 may provide computation, software, data access, storage, and/or other services that do not require end-user knowledge of a physical location and configuration of a system and/or a device that delivers the services. In some implementations, the private network 108 may be, or may be included in, a MEC environment (e.g., that is associated with the MEC system 106).

The core network 310 includes various types of core network architectures, such as a 5G Next Generation (NG) Core, a Long-Term Evolution (LTE) Evolved Packet Core (EPC), and/or the like. In some implementations, the core network 310 may be implemented on physical devices, such as a gateway, a mobility management entity, and/or the like. In some implementations, the hardware and/or software implementing the core network 310 may be virtualized (e.g., through the use of network function virtualization and/or software-defined networking), thereby allowing for the use of composable infrastructure when implementing the core network 310. In this way, networking, storage, and compute resources can be allocated to implement the functions of the core network 310 in a flexible manner as opposed to relying on dedicated hardware and software to implement these functions.

The data network 320 includes one or more wired and/or wireless networks. For example, the data network 320 may include a cellular network (e.g., a fifth generation (5G) network, a fourth generation (4G) network, a LTE network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
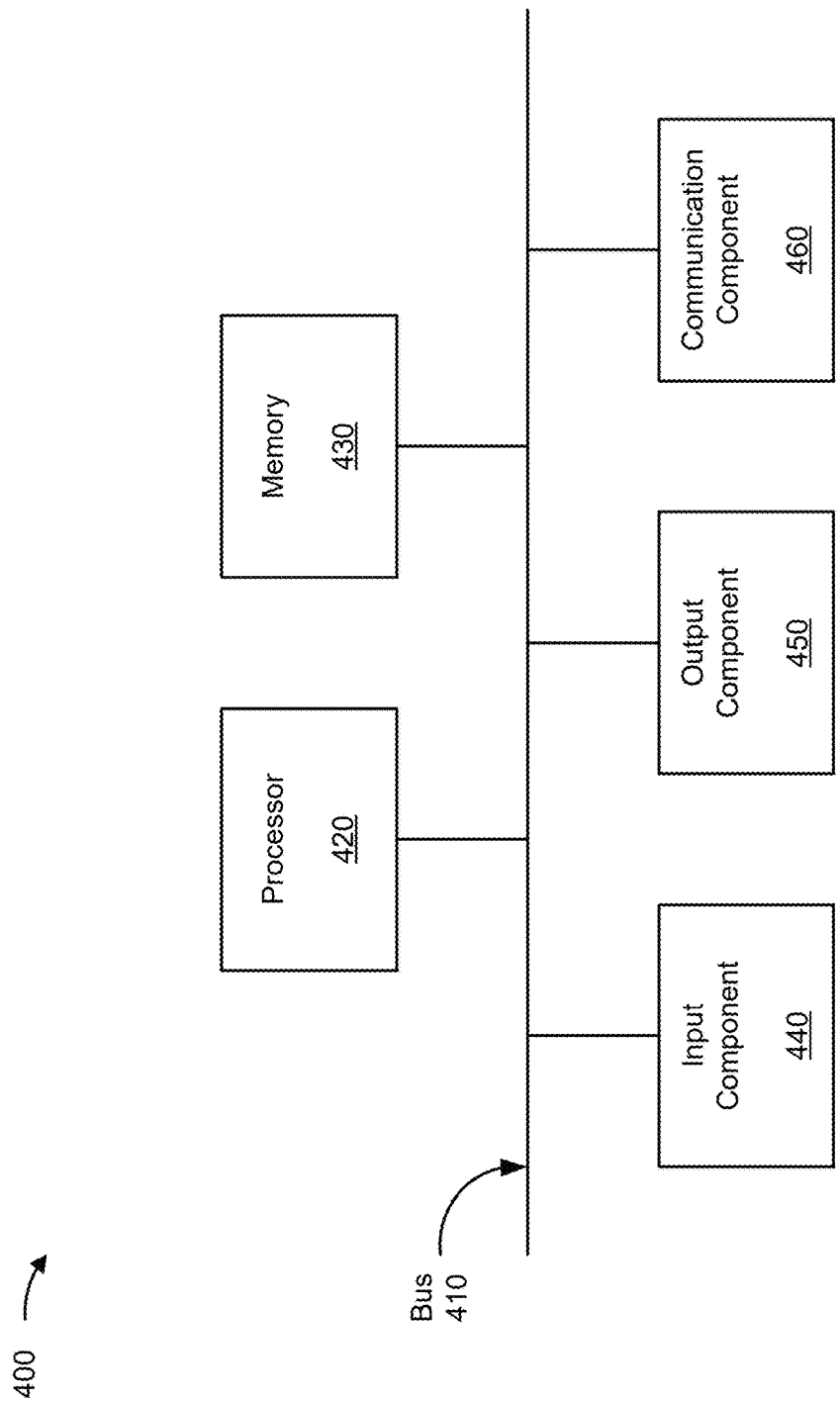
FIG. 4 is a diagram of example components of one or more devices of FIG. 3.

FIG. 4 is a diagram of example components of a device 400, which may correspond to the UE 102, the base station 104, and/or the MEC system 106. In some implementations, the UE 102, the base station 104, and/or the MEC system 106 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with using dynamic RF response information to authenticate a user equipment. In some implementations, one or more process blocks of FIG. 5 may be performed by a system (e.g., MEC system 106). In some implementations, one or more process blocks of FIG. 5 may be performed by another device or a group of devices separate from or including the system, such as a UE (e.g., UE 102) and/or a base station (e.g., base station 104). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include identifying a user equipment (block 510). For example, the system may identify a user equipment that is to access a private network, as described above.

As further shown in FIG. 5, process 500 may include authenticating the user equipment (block 520). For example, the system may authenticate the user equipment to grant the user equipment access to the private network, as described above. In some implementations, authenticating the user equipment includes obtaining original RF response information associated with the user equipment, determining subsequent RF response information associated with the user equipment, and authenticating, based on the original RF response information and the subsequent RF response information, the user equipment.

As further shown in FIG. 5, process 500 may include obtaining dynamic RF response information associated with the user equipment and additional dynamic information associated with the user equipment (block 530). For example, the system may obtain, after authenticating the user equipment, dynamic RF response information associated with the user equipment and additional dynamic information associated with the user equipment, as described above. In some implementations, the dynamic RF response information includes data that indicates a respective RF response of the user equipment at one or more instants of time within a period of time. The additional dynamic information may include at least one of information indicating at least one location of the user equipment within a period of time, information indicating network activity of the user equipment within the period of time, information indicating task activity of the user equipment within the period of time, or information indicating one or more states of at least one component of the user equipment within the period of time.

In some implementations, obtaining the dynamic RF response information associated with the user equipment and the additional dynamic information associated with the user equipment includes receiving, from a base station associated with the private network, the dynamic RF response information associated with the user equipment, wherein the dynamic RF response information is automatically provided to the base station in response to the base station providing at least one first communication transmission signal to the user equipment, and receiving, from the base station, the additional dynamic information that is generated by the user equipment, wherein the additional dynamic information is included in at least one second communication transmission signal that the user equipment provides to the base station.

As further shown in FIG. 5, process 500 may include determining a current behavior profile of the user equipment (block 540). For example, the system may determine, based on the dynamic RF response information and the additional dynamic information, a current behavior profile of the user equipment, as described above. In some implementations, the current behavior profile of the user equipment indicates at least one of a respective RF response of the user equipment at one or more first instants of time within a period of time, one or more physical locations of the user equipment in the private network within the period of time, one or more virtual locations of the user equipment in the private network within the period of time, one or more process task groups that are associated with the user equipment within the period of time, one or more tasks performed by the user equipment within the period of time, a respective amount of time that the user equipment performs the one or more tasks within the period of time, an amount of data transmitted by the user equipment within the period of time, a respective identifier of one or more devices that communicate with the user equipment within the period of time, a respective state of one or more components of the user equipment at one or more second instants of time within the period of time, or a power consumption of the user equipment within the period of time.

As further shown in FIG. 5, process 500 may include determining a baseline behavior profile of the user equipment (block 550). For example, the system may determine, using a machine learning model, a baseline behavior profile of the user equipment, as described above. In some implementations, determining the baseline behavior profile of the user equipment includes identifying prior dynamic RF response information associated with the user equipment and prior additional dynamic information associated with the user equipment, and processing, using the machine learning model, the prior dynamic RF response information and the prior additional dynamic information to determine the baseline behavior profile of the user equipment.

As further shown in FIG. 5, process 500 may include generating comparison information (block 560). For example, the system may generate, based on the current behavior profile and the baseline behavior profile, information that indicates at least one difference between the current behavior profile and the baseline behavior profile, as described above. In some implementations, determining the information that indicates at least one difference between the current behavior profile and the baseline behavior profile includes identifying, based on the baseline behavior profile, first information associated with a behavioral characteristic of the user equipment, identifying, based on the current behavior profile, second information associated with the behavioral characteristic of the user equipment, and determining that the first information does not match the second information.

As further shown in FIG. 5, process 500 may include granting or denying the user equipment access to a resource of a private network (block 570). For example, the system may grant or deny, based on the information that indicates at least one difference between the current behavior profile and the baseline behavior profile, the user equipment access to a resource of the private network, as described above. In some implementations, granting or denying the user equipment access to the resource of the private network includes identifying, based on the information that indicates at least one difference between the current behavior profile and the baseline behavior profile, a behavioral characteristic of the user equipment and a deviation associated with the behavioral characteristic, identifying one or more authentication criteria associated with the behavioral characteristic, determining, based on the deviation associated with the behavioral characteristic, that the one or more authentication criteria are satisfied, and granting, based on determining that the one or more authentication criteria are satisfied, the user equipment access to the resource of the private network. Alternatively, it may include identifying, based on the information that indicates at least one difference between the current behavior profile and the baseline behavior profile, a behavioral characteristic of the user equipment and a deviation associated with the behavioral characteristic, identifying one or more authentication criteria associated with the behavioral characteristic, determining, based on the deviation associated with the behavioral characteristic, that the one or more authentication criteria are not satisfied, and denying, based on determining that the one or more authentication criteria are not satisfied, the user equipment access to the resource of the private network.

In some implementations, the system denies the user equipment access to the resource of the private network, and process 500 further includes obtaining, after denying the user equipment access to the resource of the private network, one or more authentication credentials from the user equipment, causing an authentication process to be performed on the one or more authentication credentials, and granting or deny, based on a result of the authentication process, the user equipment access to the resource of the private network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system, comprising:
   one or more hardware processors configured to:
      identify a user equipment that is to access a private network; obtain, original dynamic radio frequency (RF) response information associated with the user equipment,
         wherein the original dynamic RF response information includes data indicating an RF response of the user equipment to a first one or more millimeter wave (mmWave) signals provided to the user equipment at one or more instants of time within a time period associated with at least one of:

formation of the user equipment,
an initial addition of the user equipment to the private network, or
a modification to the user equipment;
determine subsequent dynamic RF response information associated with the user equipment,
wherein the subsequent dynamic RF response information includes data indicating an RF response of the user equipment to a second one or more mmWave signals provided to the user equipment at one or more instants of time after the time period;
authenticate the user equipment when respective RF variations indicated by the RF response of the user equipment to the first one or more mmWave signals and respective RF variations indicated by the RF response of the user equipment to the second one or more mmWave signals are the same or similar;
obtain, after authenticating the user equipment, dynamic RF response information associated with the user equipment and additional dynamic information generated by the user equipment, wherein the additional dynamic information is included in one or more mmWave signals provided by the user equipment;
determine, based on the dynamic RF response information and the additional dynamic information, a current behavior profile of the user equipment;
determine, based on the original dynamic RF response information and prior additional dynamic information associated with the user equipment, a baseline behavior profile of the user equipment;
generate, based on the current behavior profile and the baseline behavior profile, comparison information; and
grant or deny, based on the comparison information, the user equipment access to a resource of the private network.

2. The system of claim 1, wherein the dynamic RF response information includes data that indicates a respective RF response of the user equipment to a third one or more mmWave signals provided to the user equipment at one or more instants of time within a period of time.

3. The system of claim 1, wherein the additional dynamic information includes at least one of:
information indicating at least one location of the user equipment within a period of time;
information indicating network activity of the user equipment within the period of time;
information indicating task activity of the user equipment within the period of time; or
information indicating one or more states of at least one component of the user equipment within the period of time.

4. The system of claim 1, wherein the one or more hardware processors, when obtaining the dynamic RF response information associated with the user equipment and the additional dynamic information associated with the user equipment, are configured to:
receive, from a base station associated with the private network, the dynamic RF response information associated with the user equipment,
wherein the dynamic RF response information is automatically provided to the base station in response to the base station providing a third one or more mmWave signals to the user equipment; and
receive, from the base station, the additional dynamic information that is generated by the user equipment, wherein the additional dynamic information included in the one or more mmWave signals provided by the user equipment is provided to the base station.

5. The system of claim 1, wherein the current behavior profile of the user equipment indicates at least one of:
a respective RF response of the user equipment at one or more first instants of time within a period of time;
one or more physical locations of the user equipment in the private network within the period of time;
one or more virtual locations of the user equipment in the private network within the period of time;
one or more process task groups that are associated with the user equipment within the period of time;
one or more tasks performed by the user equipment within the period of time;
a respective amount of time that the user equipment performs the one or more tasks within the period of time;
an amount of data transmitted by the user equipment within the period of time;
a respective identifier of one or more devices that communicate with the user equipment within the period of time;
a respective state of one or more components of the user equipment at one or more second instants of time within the period of time; or
a power consumption of the user equipment within the period of time.

6. The system of claim 1, wherein the one or more hardware processors, when determining the baseline behavior profile of the user equipment, are configured to:
identify the original dynamic RF response information and the prior additional dynamic information; and
process, using a machine learning model, the original dynamic RF response information and the prior additional dynamic information to determine the baseline behavior profile of the user equipment.

7. The system of claim 1, wherein the one or more hardware processors, when determining the comparison information, are configured to:
identify, based on the baseline behavior profile, first information associated with a behavioral characteristic of the user equipment;
identify, based on the current behavior profile, second information associated with the behavioral characteristic of the user equipment; and
determine that the first information does not match the second information.

8. The system of claim 1, wherein the one or more hardware processors, when granting or denying the user equipment access to the resource of the private network, are configured to:
identify, based on the comparison information, a behavioral characteristic of the user equipment and a deviation associated with the behavioral characteristic;
identify one or more authentication criteria associated with the behavioral characteristic;
determine, based on the deviation associated with the behavioral characteristic, that the one or more authentication criteria are satisfied; and
grant, based on determining that the one or more authentication criteria are satisfied, the user equipment access to the resource of the private network.

9. The system of claim 1, wherein the one or more hardware processors, when granting or denying the user equipment access to the resource of the private network, are configured to:
  identify, based on the comparison information, a behavioral characteristic of the user equipment and a deviation associated with the behavioral characteristic;
  identify one or more authentication criteria associated with the behavioral characteristic;
  determine, based on the deviation associated with the behavioral characteristic, that the one or more authentication criteria are not satisfied; and
  deny, based on determining that the one or more authentication criteria are not satisfied, the user equipment access to the resource of the private network.

10. The system of claim 1, wherein the system denies the user equipment access to the resource of the private network, and
  wherein the one or more hardware processors are further configured to:
    obtain, after denying the user equipment access to the resource of the private network, one or more authentication credentials from the user equipment;
    cause an authentication process to be performed on the one or more authentication credentials; and
    grant or deny, based on a result of the authentication process, the user equipment access to the resource of the private network.

11. The system of claim 1, wherein the one or more hardware processors, to obtain the dynamic RF response information and the additional dynamic information, are configured to:
  obtain the dynamic RF response information on an ad-hoc basis.

12. A non-transitory computer-readable medium storing a set of instructions, the set of instructions comprising:
  one or more instructions that, when executed by one or more processors of a system, cause the system to:
    receive, from a user equipment, a request for access to a resource of a private network;
    obtain, based on the request, original dynamic radio frequency (RF) response information associated with the user equipment, wherein the original dynamic RF response information includes data indicating an RF response of the user equipment to a first one or more millimeter wave (mmWave) signals provided to the user equipment at one or more instants of time within a time period associated with at least one of:
      formation of the user equipment,
      an initial addition of the user equipment to the private network, or
      a modification to the user equipment;
    determine subsequent dynamic RF response information associated with the user equipment,
      wherein the subsequent dynamic RF response information includes data indicating an RF response of the user equipment to a second one or more mmWave signals provided to the user equipment at one or more instants of time after the time period;
    authenticate the user equipment when respective RF variations indicated by the RF response of the user equipment to the first one or more mmWave signals and respective RF variations indicated by the RF response of the user equipment to the second one or more mmWave signals are the same or similar;
    obtain, based on authenticating the user equipment, dynamic RF response information associated with the user equipment and additional dynamic information generated by the user equipment, wherein the additional dynamic information is included in one or more mmWave signals provided by the user equipment;
    determine, based on the dynamic RF response information and the additional dynamic information, a current behavior profile of the user equipment;
    determine, based on the original dynamic RF response information and prior additional dynamic information associated with the user equipment, a baseline behavior profile of the user equipment;
    generate, based on the current behavior profile and the baseline behavior profile, comparison information; and
    grant or deny, based on the comparison information, the user equipment access to the resource of the private network.

13. The non-transitory computer-readable medium of claim 12, wherein the one or more instructions, that cause the system to obtain the dynamic RF response information and the additional dynamic information, cause the system to:
  identify, based on the request, an identifier associated with the user equipment;
  search, based on the identifier, at least one data structure to identify at least one entry associated with the user equipment; and
  process the at least one entry to obtain the dynamic RF response information and the additional dynamic information.

14. The non-transitory computer-readable medium of claim 12, wherein the one or more instructions, that cause the system to determine the comparison information, cause the system to:
  identify a behavioral characteristic of the user equipment;
  determine, based on the baseline behavior profile, first information associated with the behavioral characteristic;
  determine, based on the current behavior profile, second information associated with the behavioral characteristic; and
  compare the first information and the second information to determine the comparison information.

15. The non-transitory computer-readable medium of claim 12, wherein the one or more instructions, that cause the system to grant or deny the user equipment access to the resource of the private network, cause the system to:
  identify, based on the comparison information, a deviation associated with a behavioral characteristic of the user equipment;
  determine, based on the deviation associated with the behavioral characteristic, whether one or more authentication criteria are satisfied; and
  grant or deny, based on determining whether the one or more authentication criteria are satisfied, the user equipment access to the resource of the private network.

16. The non-transitory computer-readable medium of claim 12, wherein the one or more instructions, when executed by the one or more processors, further cause the system to:
  update a machine learning model used to determine the baseline behavior profile based on at least one of:
    the request,
    the dynamic RF response information, the additional dynamic information,
the current behavior profile,
the baseline behavior profile,
the comparison information, or
information indicating whether the system granted or denied the user equipment access to the resource of the private network.

17. The non-transitory computer-readable medium of claim 12, wherein the system denies the user equipment access to the resource of the private network,
wherein the one or more instructions, when executed by the one or more processors, further cause the system to:
obtain, after denying the user equipment access to the resource of the private network, one or more authentication credentials from the user equipment;
cause an authentication process to be performed on the one or more authentication credentials; and
grant or deny, based on a result of the authentication process, the user equipment access to the resource of the private network.

18. A method for authenticating a user equipment, comprising:
obtaining, by a system, original dynamic radio frequency (RF) response information associated with the user equipment, wherein the original dynamic RF response information includes data indicating an RF response of the user equipment to a first one or more millimeter wave (mmWave) signals provided to the user equipment at one or more instants of time within a time period associated with at least one of:
formation of the user equipment,
an initial addition of the user equipment to a private network, or
a modification to the user equipment;
determining, by the system, subsequent dynamic RF response information associated with the user equipment,
wherein the subsequent dynamic RF response information includes data indicating an RF response of the user equipment to a second one or more mmWave signals provided to the user equipment at one or more instants of time after the time period;
authenticating, by the system, the user equipment when respective RF variations indicated by the RF response of the user equipment to the first one or more mmWave signals and respective RF variations indicated by the RF response of the user equipment to the second one or more mmWave signals are the same or similar;
obtaining, by the system and based on authenticating the user equipment, dynamic RF response information associated with the user equipment and additional dynamic information generated by the user equipment, wherein the additional dynamic information is included in one or more mmWave signals Provided by the user equipment;
determining, by the system, and based on the dynamic RF response information and the additional dynamic information, a current behavior profile of the user equipment;
determining, by the system, and based on the original dynamic RF response information and prior additional dynamic information associated with the user equipment, a baseline behavior profile of the user equipment;
generating, by the system, and based on the current behavior profile and the baseline behavior profile, comparison information
and
granting or denying, by the system and based on the comparison information, access of the user equipment to a resource of a private network.

19. The method of claim 18, further comprising:
processing, using a machine learning model, the original dynamic RF response information to determine the baseline behavior profile of the user equipment.

20. The method of claim 18, wherein the granting or denying access of the user equipment to the resource of the private network comprises:
determining, based on the comparison information, whether one or more authentication criteria are satisfied; and
granting or denying, based on determining whether the one or more authentication criteria are satisfied, access of the user equipment to the resource of the private network.

* * * * *